United States Patent [19]

Clyde et al.

[11] Patent Number: 5,464,639
[45] Date of Patent: Nov. 7, 1995

[54] COMPOSITION AND PROCESS USED FOR STABILIZING EGG PROTEINS SUBJECTED TO SUBSEQUENT HEAT TREATMENT

[75] Inventors: Gene F. Clyde, New Milford, Conn.; Marta P. Izquierdo Quimi; Luis R. King Solis, both of Quito, Ecuador

[73] Assignee: NESTEC S.A., Vevey, Switzerland

[21] Appl. No.: 366,072

[22] Filed: Dec. 29, 1994

[30] Foreign Application Priority Data

Jan. 13, 1994 [EP] European Pat. Off. ............. 94100409

[51] Int. Cl.$^6$ .............................. A21D 2/00; A23L 1/24; A23L 1/105; A23L 3/3463
[52] U.S. Cl. .............. 426/20; 426/605; 426/654
[58] Field of Search ................... 426/20, 605, 654

[56] References Cited

U.S. PATENT DOCUMENTS

| | | | |
|---|---|---|---|
| 2,056,082 | 9/1936 | Tranin | 99/113 |
| 3,615,697 | 10/1971 | Hollenbeck | 426/18 |
| 3,619,206 | 11/1971 | Evans et al. | 426/605 |

FOREIGN PATENT DOCUMENTS

| | | |
|---|---|---|
| 0035204 | 9/1981 | European Pat. Off. . |
| 235773 | 8/1979 | German Dem. Rep. . |
| 258358 | 3/1988 | German Dem. Rep. . |
| 57-094225 | 11/1982 | Japan . |
| 2257856 | 10/1990 | Japan . |

OTHER PUBLICATIONS

Rossi et al. Brief Communications of the XXIII International Dairy Compress, Montreal, Oct. 8–12, 1990 vol. II p. 411.

*Primary Examiner*—Jeanette Hunter
*Assistant Examiner*—Choon P. Koh
*Attorney, Agent, or Firm*—Pennie & Edmonds

[57] ABSTRACT

Egg proteins, more specifically egg yolk proteins, or emulsions containing egg yolk proteins which are intended to subsequent thermal treatment, e.g. heat sterilization, are stabilized by addition thereto of an acidic amylaceous fermented composition resulting from a process wherein a) a slurry of cereal flour and at least one additional non-cereal starch material is first subjected to gelatinization and further homogenized;

b) inoculated with an acidifying strain or a mixture of acidifying strains selected from Lactobacillus species and *Streptococcus thermophilus*;

c) then subjected to a fermentation over a period and at a temperature such as to afford a pH of about 4.0 to 4.2 of the fermented material; and d) finally stabilized.

Stabilizing composition useful therefor and foodstuffs containing same.

14 Claims, No Drawings

COMPOSITION AND PROCESS USED FOR STABILIZING EGG PROTEINS SUBJECTED TO SUBSEQUENT HEAT TREATMENT

TECHNICAL FIELD

The invention relates a to process for stabilizing egg yolk proteins or emulsions containing egg yolk proteins which are intended to subsequent thermal treatment such as heat sterilization for example.

The invention further relates to compositions useful for stabilizing said food materials as well as to foodstuffs which comprise such a stabilizing composition.

BACKGROUND ART

Egg proteins, more specifically egg yolk proteins, or edible materials such as emulsions comprising egg yolk proteins are often subjected to some heat treatment, either during their preparation or thereafter, mainly for sterilization purpose. Due to the high temperatures which conventionally apply for sterilization, even for a very short period like in the UHT sterilization process, drastic modification of egg proteins may occur, leading to undesired hardening, flocculation, curdling or separation of ingredients. In such circumstances long term storage e.g. is quite impossible.

These drawbacks are clearly apparent in case of emulsions, either oil-in-water or water-in-oil emulsions, which comprise egg yolk proteins like sauces of the "hollandaise" or "béarnaise" type. As long term storage is necessary for business purpose heat sterilization of same frequently proved unsatisfying, especially due to the separation of the oily phase from the emulsion which appears after a while.

Despite many previous attempts to stabilize these kinds of products, which perform more or less successfully depending on the various additional ingredients used or the methods applied, there still remains a strong need in the art to have more appropriate stabilizing means.

U.S. Pat. No. 2,056,082 discloses a method of treating egg white including mixing same with a fermented alcoholic culture to form a mixture, allowing the mixture to acidify to remove undesirable components therefrom and finally separating purified albumen from the thus treated egg white. Such a method, however, is directed mainly to preparing and drying egg white or albumen, but cannot be applied to the above mentioned stabilization process.

JP-A-2257856 refers to heat resistant egg white compositions which do not coagulate when heated in aqueous solution. The method disclosed comprises regulating the pH of the egg white solution to about 8 to 10 before heating. This method, however, does not lead to any solution suitable for stabilising egg yolk proteins or emulsions containing same as defined here above.

SUMMARY OF THE INVENTION

The present invention brings to the man in the art a new and original solution to that problem, providing a new stabilizing composition which proves very inexpensive, safe in terms of food regulation, flexible and particularly effective when considering long term storage after heat treatments of egg yolk proteins.

First object of the invention is a process for stabilizing egg yolk proteins or emulsions containing egg yolk proteins intended to subsequent thermal treatment, which comprises adding thereto an acidic amylaceous fermented composition resulting from a process wherein a) a slurry of cereal flour and at least one additional non-cereal starch material is first subjected to gelatinization and further homogenized;

b) inoculated with an acidifying strain or a mixture of acidifying strains selected from Lactobacillus species and *Streptococcus thermophilus;* c) then subjected to a fermentation over a period and at a temperature such as to afford a pH of about 4.0 to 4.2 of the fermented material; and d) finally stabilized.

Another object of the invention is a composition useful for stabilizing egg yolk proteins or emulsions containing egg yolk proteins intended to subsequent treatment consisting in an acidic amylaceous fermented composition resulting from a process wherein a) a slurry of cereal flour and at least one additional non-cereal starch material is first subjected to gelatinization an further homogenized;

b) inoculated with an acidifying strain or a mixture of acidifying strains selected from Lactobacillus species and *Streptococcus thermophilus;* c) then subjected to a fermentation over a period and at a temperature such as to afford a pH of about 4.0 to 4.2 of the fermented material: and d) finally stabilized.

A third object of the invention is a foodstuff which comprises egg proteins or an emulsion containing egg proteins and a composition as defined here above.

DETAILED DESCRIPTION OF THE PREFERRED EMBODIMENTS

According to the invention, as cereal flour subjected to fermentation one can use conveniently rice flour, wheat flour, oat flour or barley flour e.g., or any mixture thereof depending on the nature of the final product (egg proteins based foodstuff). Rice flour is preferred in view of its very neutral taste.

In addition to the above cereal flour there is also used, according to the invention, a non-cereal starch material such as potato starch or manioc starch. When subjected to the various treatments which are described here after, such non-cereal starch material provides the desired smoothness, thickness and stability of the fermented material.

Relative proportions of cereal flour and non-cereal starch material will greatly depend on the nature and quality of the final product to stabilize. It is the task of the man in the art to select the most appropriate kinds of ingredients and their relative proportions to reach the desired effect: in most cases this can be done based on routine trials.

The gelatinization of the selected flour cereal and non-cereal starch material can be effected according to the conventional techniques, steam heating e.g. Homogenization of the gelatinized mixture is preferably carried out using wet-milling devices.

According to the invention the homogenized starch and cereal material is then subjected to a fermentation making use of specific acidifying strains or mixture of strains, more particularly strains selected from various Lactobacillus species or *Streptococcus thermophilus.*

As Lactobacillus species useful in accordance with the invention one can use conveniently strains selected from *L. acidophilus, L. casei, L. plantarum, L. delbrueckii, L. brevis, L. pentosus, L. mesenteroides* and *L. bulgaricus.*

If it is desired, mixtures of two distinct Lactobacillus species can also be used, for example L. plantarum and L. casei, or even two distinct subspecies of the same Lactobacillus species such as L. plantarum e.g.

The fermentation can also be performed using one Lactobacillus species, L. casei for example, together with a non-Lactobacillus species, in that case preferably Streptococcus thermophilus. An example of mixture of acidifying strains which proved particularly well performing is described here below.

As various strains can behave differently selection of same will be mainly directed by their acidifying power as well as their impact on the fermented material, either in terms of final taste or viscosity e.g.

According to the invention the fermentation process is carried out following conventional techniques, over a period and at temperatures such as to afford a pH of 4.0 to 4.2 of the fermented material. Indeed final pH is one of the most critical parameters one needs to control to achieve the desired quality.

Of course, dry matter content, viscosity or consistency, as well as taste and colour will also condition appropriate use of the fermented material in accordance with the invention. Considered on a relatively wide basis, useful stabilizing compositions are further characterized by a dry matter content of about 12 to 16 weight %, a total acidic content of about 0.32 to 0.37 weight % expressed as lactic acid content and a consistency of about 5 to 10 cm/15 s. at 20° C.

As referred to here above the fermented material thus afforded proves extremely useful for stabilizing egg yolk proteins in various foodstuffs subjected to subsequent heat treatment. As such foodstuffs one can consider several types of sauces like a "sauce hollandaise", a "sauce béarnaise" or similar sauces which are industrially prepared and sterilized at elevated temperature before storage and further sales to the consumers.

As other foodstuffs comprising egg yolk proteins subjected to significant heat treatment one can cite desserts of the sabayon type. Surprisingly, even resulting from acidifying fermentation, the stabilizing composition matches with the specific taste and sweetness of the standard product.

It has been further observed that the addition of fermented cereal material, even in significant amounts, does not impart any "floury" or "cooked cereal" taste or like to the sauces or desserts.

Again, it is the task of the man in the art to determine the quality and the proportions of fermented material to mix with the other ingredients characterizing the selected foodstuff in order to achieve the desired goal, i.e. stabilizing the egg yolk proteins.

EXAMPLES

The following examples illustrate the invention in a more detailed manner. These examples, however, do not limit the invention in any way and unless specified otherwise the temperatures are given in degrees Celsius and the percentages are weight percent.

Example 1

Preparation of a fermented material a) Inoculum

A culture medium for a mixture of Lactobacillus and Streptococcus strains was prepared using the following ingredients (parts by weight):

| | |
|---|---|
| rice flour | 150 |
| skimmed milk powder | 70 |
| sucrose | 50 |
| calcium monophosphate | 2 |
| yeast extract* | 40 |
| alpha-amylase | 0.2 |
| distilled water | 100 |

*DIFCO 0127-01-7 and subjecting the above mixture to sterilization at approx. 120° C. for 15 min.

After cooling, portions of the above culture medium were separately inoculated at a rate of 1% (weight) with the strains defined here below:

| | |
|---|---|
| Streptococcus thermophilus (CNCM I-1383) | 0.5 |
| Lactobacillus casei (ATCC 393) | 1.0 | then incubated at 40° C. for 4 hours up to achievement of the desired growth rate: $10^8$ to $10^9$ colony forming units per gram of inoculum and finally combined in a way to achieve the relative proportions defined here above; final pH 4.4.

b) Fermentation

The following ingredients were mixed in a container suitable for heat treatment (parts expressed in kilograms):

| | |
|---|---|
| rice flour | 105 |
| manioc starch | 23 |
| wheat flour | 14 |
| sucrose | 6 |
| skimmed milk powder | 6 |
| water | 750 |

The above mixture was then injected with steam up to get a temperature of 135° C. and further kept at that temperature for 2 min., then mechanically homogenized and finally cooled at approx. 35° C.

The resulting slurry was then transferred into a fermentation tank, then inoculated with the mixture of strains referred to here above, at a rate of 2.5% of weight of liquid inoculum per weight of slurry, and further added with sodium citrate at a rate of 0.04% weight.

The fermentation took place at 35° C. for 8 hours affording to an acidic amylaceous fermented material which was characterized as follows: pH 4.0–4.2; total acidic content 0.32–0.37% (expressed as weight of lactic acid); dry matter content 14–15% (weight) and consistency of 8 cm/15 s at 20° C. as defined hereafter. The thus afforded material is a white translucent paste having a smooth structure.

"Consistency" measurement provides a characteristic value of this kind of material which may be compared to the flowing rate of the liquid or semi-liquid material. It consists to measure the unidirectional horizontal move of a sample of material per time unit, in the present case in cm. per 15 s. period (at 20° C. e.g.).

The fermented material was stored under 10° C. before using.

Example 2

Preparation of a "sauce hollandaise"

The following ingredients were mixed, then reduced to half of their volume and finally strained through a cheese cloth (parts by weight):

| | |
|---|---|
| white wine | 763 |
| fresh chopped onions | 382 |
| crushed black pepper corns | 8 |
| chilli powder | 4 |
| food grade colour | |

The thus obtained reduction was then mixed under stirring with the ingredients mentioned hereafter, at a temperature of approx. 50° C.:

| | |
|---|---|
| egg yolk | 458 |
| clarified butter | 1909 |
| fermented material according to Example 1 | 6361 |
| salt | 102 |
| potassium sorbate | 13 |

The resulting mixture was finally pasteurized at 100° C. and finally homogenized to afford a sauce hollandaise type material which proved perfectly stable after prolonged storage. The above product also proved quite stable after UHT treatment, 140° C. for 10 s, showing no curdling as well as no separation of the oily phase.

Example 3

Preparation of a "sauce béarnaise"

The following ingredients were mixed, then reduced to approx. half of their volume and finally strained through cheese cloth (parts by weight):

| | |
|---|---|
| white wine | 377 |
| fresh chopped scallion | 377 |
| crushed black pepper corns | 7 |
| chilli powder | 3 |
| tarragon vinegar | 503 |

The thus obtain reduction was then mixed under stirring with the ingredients mentioned hereafter, at a temperature of approx. 50° C.:

| | |
|---|---|
| egg yolk | 453 |
| clarified butter | 1887 |
| fermented material according to Example 1 | 6293 |
| salt | 100 |

The resulting mixture was finally pasteurized at 100° C. and finally homogenized to afford a sauce béarnaise type material which proved quite stable after prolonged storage.

The above product also proved stable after UHT treatment, 140° C. for 10 s., showing no curdling as well as no separation of the oil phase.

Example 4

Preparation of a "sabayon"

The following ingredients were used as briefly described hereafter, applying the conventional technologies.

| Ingredients | Weight percentage |
|---|---|
| Fermented material according to Example 1 | 23.36 |
| white wine | 26.36 |
| sugar | 21.09 |
| whole eggs | 9.84 |
| marsala | 8.79 |
| egg yolks | 6.68 |
| food grade gelatine | 0.88 |

Preparation: mix all ingredients together and heat them to 90° C. in a water bath, stirring constantly until thickening. Cool down the mixture to room temperature.

Information relating to microorganisms

1. *Streptococcus thermophilus* CNCM I-1383

Isolated from a fermented dairy product.

Morphology: diplococcus form, frequently grouped as small size chains, no tail. No spore formation observed—Gram positive microorganisms, catalase negative and factultatively anaerobic.

Fermentation of sugars: produces lactic acid from Dglucose, lactose and sucrose.

Exhibits texturizing properties through exopolysaccharides production.

Registered on Dec. 8, 1993 in accordance with the rules of the Budapest Convention under No. I-1383 at the Collection Nationale de Cultures de Microorganismes—Institut Pasteur—28, rue du Docteur Roux F-75724 Paris.

2. Lactobacillus casei ATCC 393

Disclosed as registration No. 393 on page 115 of the 1989 Catalog of the American Type Culture Collection 12301 Parklawn Drive—Rockville, Md. 20852 USA.

What is claimed is:

1. Process for stabilizing egg yolk proteins or emulsions containing egg yolk proteins intended to subsequent thermal treatment, which comprises adding thereto an acidic amylaceous fermented composition resulting from a process wherein
   a) a slurry of cereal flour and at least one additional non-cereal starch material is first subjected to gelatinization and further homogenized;
   b) inoculated with an acidifying strain or a mixture of acidifying strains selected from Lactobacillus species and *Streptococcus thermophilus;*
   c) then subjected to a fermentation over a period and at a temperature such as to afford a pH of about 4.0 to 4.2 of the fermented material; and
   d) finally stabilized.

2. Process according to claim 1, wherein cereal flour is rice flour, wheat flour, oat flour, barley flour or any mixture thereof.

3. Process according to claim 1, wherein the non-cereal starch material is potato starch or manioc starch.

4. Process according to claim 1, wherein Lactobacillus species are selected from *L. acidophilus, L. casei, L. plantarum, L. delbrueckii, L. brevis, L. pentosus, L. mesenteroides* and *L. bulgaricus.*

5. Process according to claim 4, wherein the mixture of strains contains two distinct Lactobacillus species, e.g. *L.*

*plantarum* and *L. casei*.

6. Process according to claim 4, wherein the mixture of strains contains two distinct subspecies of the same Lactobacillus species, e.g. *L. plantarum*.

7. Process according to claim 1, wherein the mixture of strains comprises at least one Lactobacillus species or subspecies and a non-Lactobacillus species.

8. Process according to claim 1, wherein homogenization of the gelatinized slurry is carried out by wet-milling.

9. Process according to claim 1, wherein the fermented material is stabilized by cooling.

10. Process according to claim 1, wherein the fermented material is further characterized by a dry matter content of about 12 to 16 weight %, a total acidic content of about 0.32 to 0.37 weight % expressed as lactic acid content and a consistency of about 5 to 10 cm/15 s. at 20° C.

11. Composition useful for stabilizing egg yolk proteins or emulsions containing egg yolk proteins intended to subsequent treatment consisting in an acidic amylaceous fermented composition resulting from a process wherein a) a slurry of cereal flour and at least one additional non-cereal starch material is first subjected to gelatinization and further homogenized;

b) inoculated with an acidifying strain or a mixture of acidifying strains selected from Lactobacillus species and *Streptococcus thermophilus;* c) then subjected to a fermentation over a period and at a temperature such as to afford a pH of about 4.0 to 4.2 of the fermented material; and d) finally stabilized.

12. Composition according to claim 11, having a pH of about 4.0 to 4.2 and further characterized by a dry matter content of about 12 to 16 weight %, a total acidic content of about 0.32 to 0.37 weight % exposed as lactic acid content and a consistency of about 5 to 10 cm/15 s at 20° C.

13. Foodstuff comprising egg yolk proteins or an emulsion containing egg yolk proteins and a composition according to claim 11.

14. Foodstuff according to claim 13, which is a heat sterilized foodstuff.

* * * * *